US005900298A

United States Patent [19]
Syme et al.

[11] Patent Number: 5,900,298
[45] Date of Patent: May 4, 1999

[54] MINERAL FIBER INSULATION BATT IMPREGNATED WITH EXTRUDED SYNTHETIC FIBERS, AND APPARATUS FOR MAKING SAME

[75] Inventors: Robert W. Syme, Mississauga, Canada; Joseph T. Church, Memphis, Tenn.; Gary E. Romes, Cincinnati, Ohio

[73] Assignee: Guardian Fiberglass, Inc., Albion, Mich.

[21] Appl. No.: 08/898,101

[22] Filed: Jul. 22, 1997

Related U.S. Application Data

[63] Continuation-in-part of application No. 08/684,463, Jul. 22, 1996, Pat. No. 5,733,624, and a continuation-in-part of application No. 08/686,049, Jul. 22, 1996, Pat. No. 5,746,854.

[51] Int. Cl.[6] ............................. E04B 2/00; E04B 1/62
[52] U.S. Cl. ........................ 428/68; 428/74; 428/121; 428/126; 428/131; 428/34.5; 428/34.7; 442/174; 442/180; 442/62; 442/398; 442/412; 52/404.1; 52/406.2
[58] Field of Search ................................ 428/34.6, 34.7, 428/34.5, 131, 136, 68, 74; 52/407, 408; 442/327, 398, 412, 62, 174, 180

[56] References Cited

U.S. PATENT DOCUMENTS

| | | |
|---|---|---|
| 4,420,521 | 12/1983 | Carr . |
| 4,927,705 | 5/1990 | Syme et al. . |
| 4,968,556 | 11/1990 | Jain . |
| 5,093,394 | 3/1992 | Rees et al. . |
| 5,102,728 | 4/1992 | Gay et al. . |
| 5,211,988 | 5/1993 | Morton . |
| 5,236,754 | 8/1993 | McBride et al. . |
| 5,240,527 | 8/1993 | Lostak et al. . |
| 5,270,092 | 12/1993 | Griffith et al. . |
| 5,277,955 | 1/1994 | Schelhorn et al. . |
| 5,318,644 | 6/1994 | McBride et al. . |
| 5,362,539 | 11/1994 | Hall et al. . |
| 5,459,291 | 10/1995 | Haines et al. . |
| 5,466,504 | 11/1995 | Gavin et al. . |
| 5,514,417 | 5/1996 | Matthews et al. . |
| 5,565,049 | 10/1996 | Simmons et al. . |
| 5,733,624 | 3/1998 | Syme et al. . |
| 5,746,854 | 5/1998 | Romes et al. . |

*Primary Examiner*—William Krynski
*Assistant Examiner*—J. M. Gray
*Attorney, Agent, or Firm*—Hall, Priddy & Myers

[57] ABSTRACT

A method of directing extruded synthetic fibers toward at least one surface of a mineral fiber insulation batt, and corresponding apparatus and resulting product. In certain embodiments, a row of extrusion heads is provided for directing extruded synthetic fibers (e.g. fibers including ethyl vinyl acetate or EVA) toward a surface(s) of the batt(s) to be impregnated with same. Optionally, extrusion heads may be provided all around the batts so as to impregnate substantially all surfaces thereof with the extruded synthetic fibers. As the fibers exit the heads, they are hit with pressurized heated air streams which cause them to go into an insipid spin which increases directional tensile strength of the resulting batt in all directions. In certain embodiments, every other batt of a plurality of batts passes over an elongated member which extends over top of the conveyor in order to more efficiently impregnate edge surfaces of the batts.

9 Claims, 7 Drawing Sheets

MINERAL FIBER INSULATION BATT IMPREGNATED WITH EXTRUDED SYNTHETIC FIBERS, AND APPARATUS FOR MAKING SAME

This application is a continuation-in-part (CIP) of Ser. No. 08/684,463, filed Jul. 22, 1996, now U.S. Pat. No. 5,733,624, and is a CIP of Ser. No. 08/686,049, filed Jul. 22, 1996, now U.S. Pat. No. 5,746,854, the disclosures of which are hereby incorporated herein by reference. Furthermore, this application is related to a simultaneously filed application entitled METHOD OF IMPREGNATING A MINERAL FIBER INSULATION BATT WITH EXTRUDED SYNTHETIC FIBERS, the disclosure of which is hereby incorporated herein by reference.

MINERAL FIBER INSULATION BATT IMPREGNATED WITH EXTRUDED SYNTHETIC FIBERS, AND APPARATUS FOR MAKING SAME

This invention relates to a mineral fiber insulation batt impregnated with extruded synthetic fibers on at least one surface thereof, and apparatus for making same. More particularly, this invention relates to a mineral fiber insulation batt having at least one surface thereof impregnated with fibers extruded from a synthetic resin (e.g. including ethyl vinyl acetate or EVA), with the extruded fibers locking onto the mineral fibers of the batt, and apparatus for making same.

BACKGROUND OF THE INVENTION

Mineral fiber insulation batts coated with kraft paper and the like are old and well-known. Examples of mineral fiber include fiberglass, rock wool, etc. Typically, the base mineral fiber insulation batt is processed along an endless conveyor system and a sheet(s) of kraft paper is adhered to at least one surface of the insulation batt. The resulting batts, coated with kraft paper, are typically used for insulating vertical wall cavities and the like.

Unfortunately, such batts suffer from the following problems: (i) they lack durability and are susceptible to damage such as tearing at job sites; (ii) they tend to allow dust to be generated therefrom; (iii) paper burns; (iv) their aesthetic appearance is less than desirable to many in the trade; and (v) cost of paper. Accordingly, there exists a need in the art to improve upon the above-listed drawbacks of kraft paper coated mineral fiber batts.

It is also known to apply polyethylene and polypropylene films to batts. For example, see U.S. Pat. Nos. 5,318,644; 5,362,539; and 5,277,955.

U.S. Pat. No. 5,362,539 discloses a polyethylene or polypropylene film applied to an insulation batt. Either an adhesive, Velcro™, or heat sealing is used to adhere the film to the mineral fiber core. Unfortunately, with respect to use of an adhesive or Velcro™ to attach the film to the core, these represent multi-step adhering processes for coating the batt with film, which are both undesirable and inefficient. Additionally, such batts are susceptible to cold-crack at temperatures which range down to about –65° F. Cold-crack often occurs when hot melt adhesives and the like are utilized to adhere laminants together, this often resulting in the laminates prematurely separating or delaminating. With respect to heat sealing the polyethylene or polypropylene to the mineral fiber core, this has been found by the instant inventors to represent a less than sufficient attachment of the film to the core. For example, the instant inventors have found that when commercial attempts to laminate polymer films to a fiberglass batt have been made, the surface strength of the lamination is sometimes incapable of maintaining the weight of the fiberglass in certain instances and often results in de-lamination. Furthermore, complex equipment is required to manufacture such poly film-coated batts, which is not cost effective.

U.S. Pat. No. 5,277,955 discloses a mineral fiber batt to which a polyethylene layer is applied. The polyethylene layer may be heated for the purpose of joining the film to the mineral batt. As discussed above, and as apparently recognized in the '955 patent, this may not result in an adequate attachment of the film to the batt. Accordingly, the disclosure of the '955 patent suffers from the same problems as those discussed above regarding the '539 patent.

U.S. Pat. No. 5,318,644 discloses a method and apparatus for making an insulation assembly, wherein a pair of polyethylene layers are utilized to encapsulate a mineral fiber batt. Unfortunately, the system of the '644 patent suffers from the same problems that are discussed above regarding the '955 and '539 patents.

In view of the above, it will be clear to those of skill in the art that there exists a need in the art for an improved mineral fiber insulation batt, and corresponding method and apparatus for manufacturing same, which is efficient and cost effective to manufacture, is easy to handle, is less susceptible to cold-crack, it is aesthetically attractive, and reduces generation of dust. It is a purpose of this invention to fulfill the above-described needs in the art as well as other needs which will become apparent to the skilled artisan upon review of this disclosure.

SUMMARY OF THE INVENTION

Generally, speaking this invention fulfills the above-described needs in the art by providing a mineral fiber insulation batt comprising:

a mineral fiber insulation substrate including a top major surface, a bottom major surface, a first edge surface, and a second edge surface opposing the first edge surface; and wherein the first and second edge surfaces are impregnated with extruded fibers including ethyl vinyl acetate or the like, which are interlocked with mineral fibers of the batt proximate the first and second edge surfaces, the extruded fibers applied to the first and second edge surfaces of the batt in an amount of from about 1.2 to 3.5 gms/ft$^2$.

In certain preferred embodiments, the extruded fibers are applied in an amount of from about 1.9 to 2.5 gms/ft$^2$.

In certain embodiments, the extruded fibers are applied to all surfaces of the batt so as to encapsulate same.

This invention further fulfills the above-described needs in the art by providing a mineral fiber insulation batt comprising:

a mineral fiber insulation substrate including first and second opposing edge surfaces;

the first and second edge surfaces being impregnated with extruded fibers of a synthetic material; and wherein the extruded fibers on the first and second edge surfaces form gas or air permeable coatings so that the batt has a compression ratio of from about 4:1 to 10:1, which is useful during shipping and the like.

This invention further fulfills the above-described needs in the art by providing an apparatus for impregnating at least one surface of a batt with extruded synthetic fibers, the apparatus comprising:

a conveyor for conveying the batt in a conveying direction;

at least one extrusion head adjacent and directed at a surface of the batt when the batt is on the conveyor, so that the surface of the batt passes adjacent the extrusion head, the extrusion head including an extrusion orifice through which molten synthetic material is forced and thereafter hit with a plurality of air streams so as to form extruded synthetic fibers;

means for extruding the synthetic fibers from the extrusion head and directing the extruded fibers onto the surface of the batt;

means in the extrusion head for directing the plurality of separate air streams toward the fiber being extruded from the extrusion orifice in order to break up the extruded fiber into a plurality of different segments or fibers, and causing the different segments to be directed toward the surface of the batt; and means for allowing the extruded fibers to cool or cure on the surface of the batt so that during the cooling, the extruded fibers interlock with fibers of the batt.

According to certain preferred embodiments, the batt is made up of either glass fibers or plastic (e.g. polyethylene) fibers, with at least one surface thereof being impregnated with the extruded fibers. Two, three, four, five, or six surfaces may be impregnated in certain embodiments.

DETAILED DESCRIPTION OF CERTAIN EMBODIMENTS OF THIS INVENTION

Referring now more particularly to the accompanying drawings in which like reference numerals indicate like parts throughout the several views.

Figure 1:
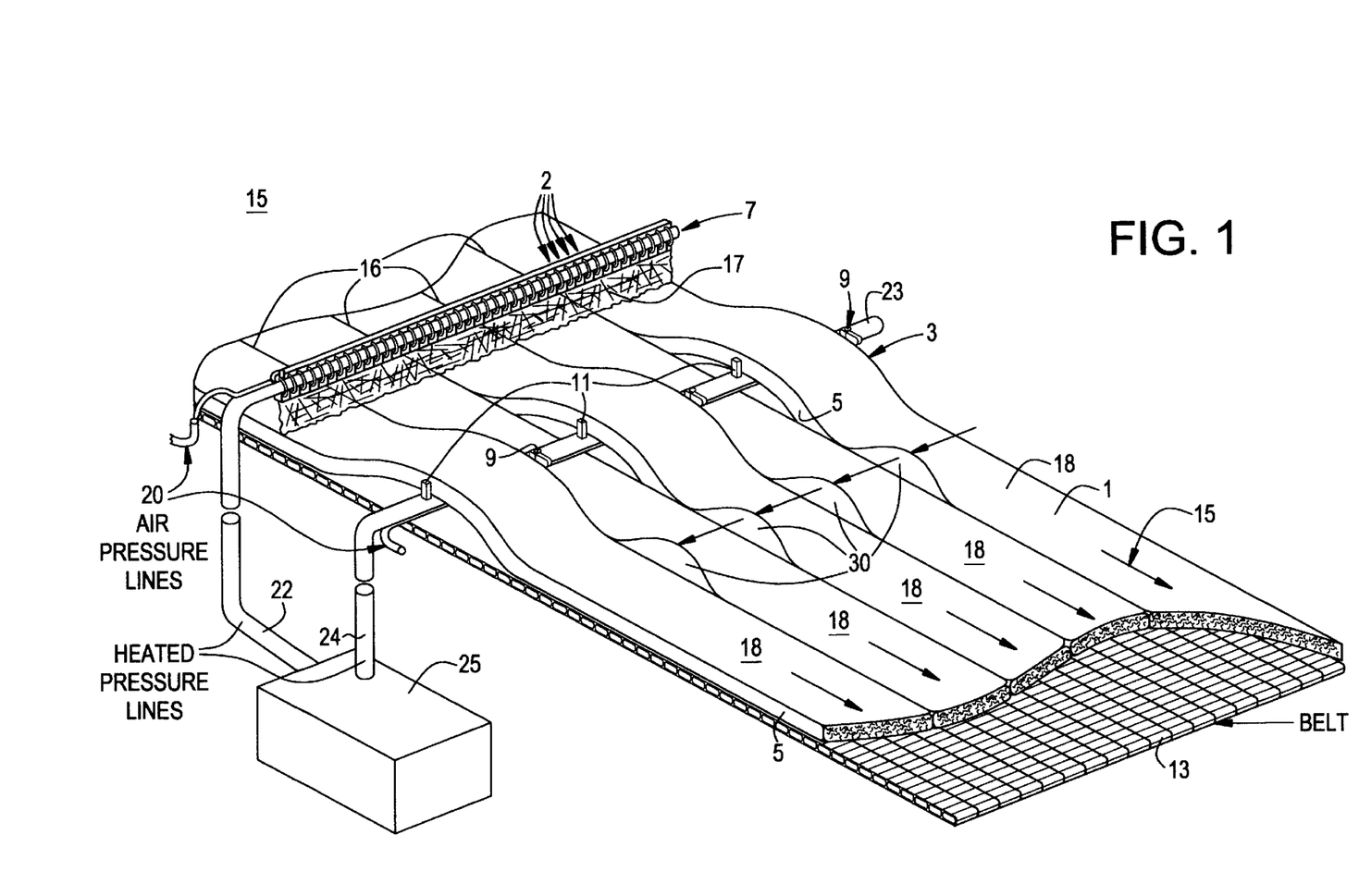
FIG. 1 is a perspective view illustrating an apparatus and method of making a mineral fiber batt according to an embodiment of this invention.

FIG. 1 is a perspective view illustrating an apparatus and method for manufacturing mineral fiber (e.g. fiberglass) binder-inclusive batts which are impregnated with extruded synthetic polymeric inclusive fibers (e.g. fiber including ethyl vinyl acetate or EVA) on at least one surface thereof. In the FIG. 1 embodiment, each of the top major surface 1, edge surface 3, and opposing edge surface 5 of each batt 18 is impregnated with fibers that are extruded from extrusion heads 2, 9, and 11. As shown, a plurality of extrusion heads 2 are disposed over top of mineral fiber batts 18 that are being conveyed by planar conveyor belt 13 in direction 15, this row 7 of extrusion heads 2 being oriented such that extruded fibers 17 that include a synthetic material (e.g. EVA) are extruded from heads 2 and are blown and fall toward the top major surfaces 1 of the numerous batt portions 18 being forwarded along belt 13.

Meanwhile, extrusion heads 11 impregnate edge surfaces 5 of batts 18 with similar extruded synthetic fibers while extrusion heads 9 impregnate opposing edge surfaces 3 of the batts with similar synthetic extruded fibers (e.g. fibers that include EVA or the like). In certain embodiments, it is desirable to provide another row of extrusion heads 2 below the lower major surface of the batts 18, at a position opposite upper row 7, so that each of the top and bottom major surfaces of batts 18, as well as the two edge surfaces 3 and 5, are impregnated with extruded synthetic fibers. Optionally, when batts 18 are cut up lengthwise, the newly formed edge surfaces may be impregnated in a similar manner so that all six surfaces are impregnated with the extruded fibers.

The result of impregnating at least one surface of mineral fiber batts 18 with extruded fibers 17 including a synthetic material such as ethyl vinyl acetate (EVA) is a batt having a synthetic outer cover that is vapor permeable and non-allergenic to workers handling or using the product. Furthermore, loose insulation fibers, such as glass fibers, that may sometimes create dust from the batt, are trapped within the batt by the extruded covering system beneath its synthetic web so as to eliminate dust-inclusive environments. The extruded synthetic fiber impregnation of the batts will resist water permeation such that any condensation that may be created will not become entrapped within the batt, and will be permitted to evaporate via standard wall ventilation (this will eliminate fungal and bacterial growth and help prevent sick-building and sick home syndrome). Other advantages of the inventive batt which include the extruded synthetic inclusive fiber covering are: improved handling capability, non-absorbent, resistant to mildew and rot, deterrent of bacterial and fungal growth, deterrent of bugs and insects, helps maintain batts and prevents them from sagging and packing under vibration load, aesthetically pleasing, and allows vapor permeability so that insulation batts (e.g. in rolls) can collapse or be compressed during shipment. Still further, the improved product assists in providing improved acoustic or sound insulation, especially in duct applications and the like.

As illustrated in FIG. 1, the apparatus and method includes slitting area 15 where the mineral fiber insulation being conveyed along belt 13 transferred from one large batt into a plurality of smaller batts 18, as the large batt is slit along lines 16 in order to provide the plurality of separate and independent batts 18 which are conveyed along the belt 13. Exemplary fiberglass insulation batts according to certain embodiments of this invention have a density of from about 0.25 to 10.0 lb./ft$^3$., preferably from about 0.5 to 2.5 lb./ft$^3$. These batts typically will have an R-value of from about 2.5 to 4.0 per inch of batt thickness, preferably from about 3.0 to 3.3 per inch thickness.

Following slitting area 15, row 7 of extrusion heads 2 directs extruded fibers 17 (e.g. fibers including EVA) toward the top major surface 1 of the plurality of batts 18 which are being forwarded along the belt. Row 7 of extrusion heads 2 is in communication with pressurized heated air supply line 20 and heated line 22 which supplies the row 7 of heads 2 with molten synthetic material, such as EVA, to be extruded by head 2 onto the top surface 1 of batts 18.

Following the deposition of the extruded synthetic fibers 17 onto the top surface of batts 18, every other or alternate batt (e.g. either the odd numbered or even numbered batts) is caused to be conveyed or arced over top of rigid elongated eliminate 23 so that the opposing edge surfaces 3, 5 of each batt 18 may be exposed and impregnated with extruded synthetic fibers directed at the respective edge surfaces from extrusion heads 9 and 11. For example, member 23 may include a rigid bar which extends across and above belt 13, and may be supplemented by pressurized airline 20 which extends across belt 13, and heated molten resin line 24 which supplies the molten material to be extruded to the various heads 9 and 11 from unit 25. Optionally, member 23 may simply be made up of conduits 20 and 24.

Generally, unit 25 represents a synthetic material preparation and pumping system where the synthetic material to be extruded is initially loaded or input, this material taking the form of pellets, blocks, chunks, chips, or the like as is known in the trade. Unit 25 forward the molten material to be extruded to heads 2, 9, and 11.

Following the impregnation of the opposing edge surfaces 35 of each batt 18 with the extruded synthetic fibers 17 by heads 9 and 11, the batts 18 which had passed over top of member 23 fall back to the upper surface of conveyor belt 13 so as to again be substantially co-planar with batts 18 that had passed underneath of member 23. The batts 18 which are conveyed by belt over top of conduits 20 and 24 form arch-like profiles over same.

Downstream of member 23 and heads 9, 11 are a plurality of disk-shaped separators (which may be cooled in certain embodiments) which are positioned along lines 16 in between the different batts 18. These separators 30 function to separate and prevent or delaminate any adhesion which may have taken place between adjacent edge surfaces 35 of immediately adjacent batts as a result of the still-warm extruded fibers which were applied by heads 9 and 11 to these edges 3, 5. In other words, separators 30 keep the batts from sticking together along their respective edge surfaces 3, 5.

According to certain alternative embodiments, the edges 3, 5 of batts 18 may be impregnated with the extruded fibers after the batts have been chopped up or cut lengthwise, instead of prior to this event as shown in FIG. 1. Still further, it will be recognized by those of skill in the art that the application of the extruded fibers to the batt surface(s) may be carried out on-line as illustrated in the drawings herein, or alternatively off-line although this latter option may not be cost effective.

Figure 2:
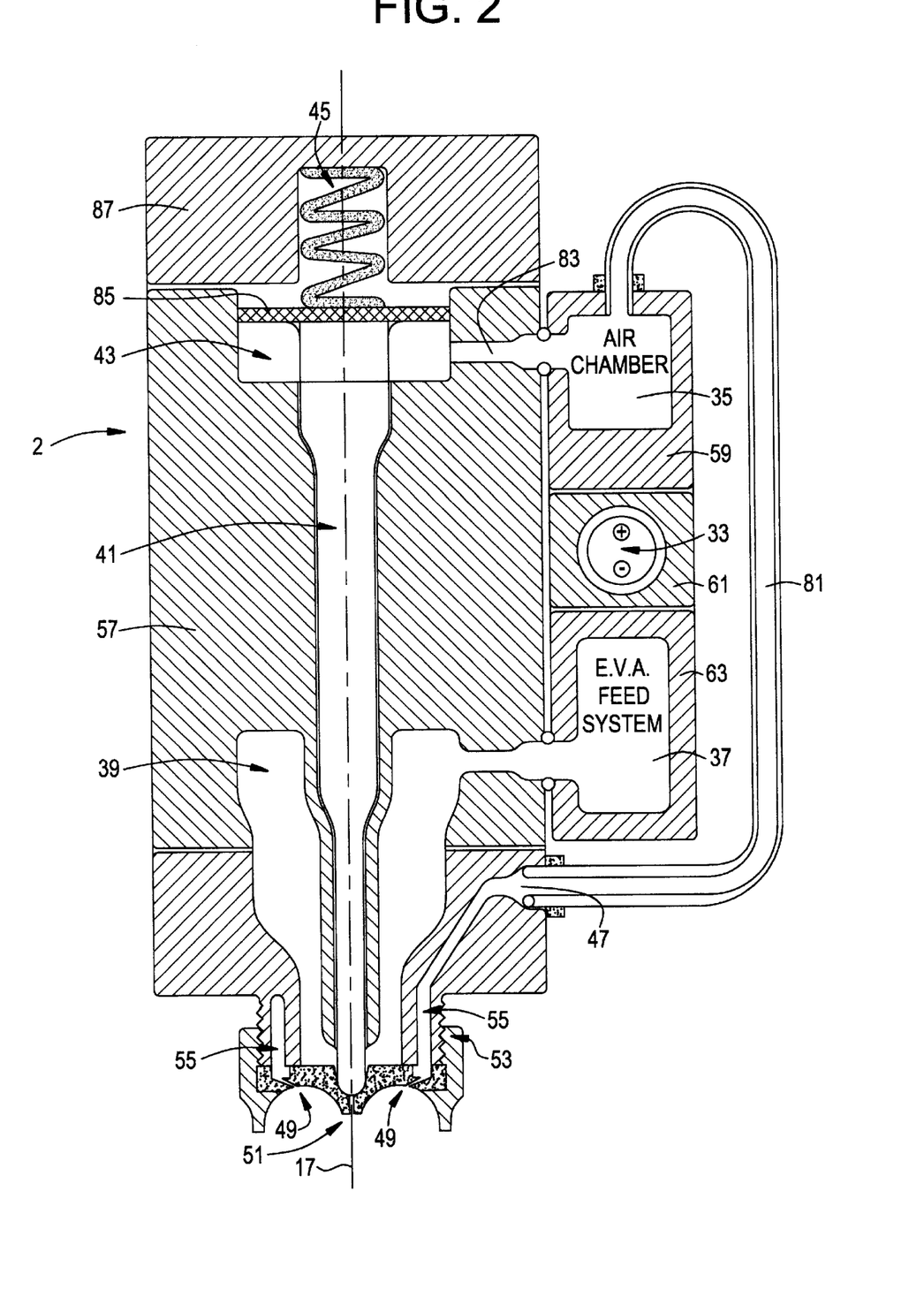
FIG. 2 is a side cross-sectional view of an extrusion head which directs extruded polymer-based synthetic fibers toward a surface of a mineral fiber batt in the FIG. 1 apparatus/method.

FIG. 2 is a cross-sectional view of one of the extrusion heads illustrated in FIG. 1. The FIG. 2 head may be, for example, one of extrusion heads 2 provided in the row 7 across the top major surface 1 of the batts. Extrusion heads 9 and 11 are the same as head 2 illustrated in FIG. 2, except that heads 9 and 11 have their air and heat conduits located in different locations.

As illustrated in FIG. 2, each extrusion head 2 includes elongated heating element 33, elongated air conduit chamber 35, chamber 37 which permits molten synthetic material (e.g. including EVA) to be fed through the head and extruded therefrom, annular EVA feed chamber 39 which surrounds one end of elongated needle valve 41 and is in communication with chamber 37, annular air chamber 43 which is selectively pressurized in order to selectively open and shut needle valve 41, biasing spring 45 which functions to bias shut needle valve 41 when air chamber 43 is not pressurized beyond a predetermined pressure threshold, air feed conduit 47 for communicating heated pressurized air to a plurality of angled orifices 49 provided adjacent extrusion aperture 51, annular head 53 threadedly attached to the main body 57 and surrounding extrusion outlet or orifice 51 and air chamber 55 which receives the pressurized air from feed 47, and finally solid frame or block 57 in which the elements described above are formed or provided. Block 57 includes a single molded metallic structure or alternatively may include a plurality of different molded structures as shown in FIG. 2, attached to one another in order to make up the extrusion head illustrated.

In alternative embodiments, one air line may be provided for opening/closing the needle valves, and a separate and independent air line may be provided for sending pressured air through orifices 49.

Figure 4:
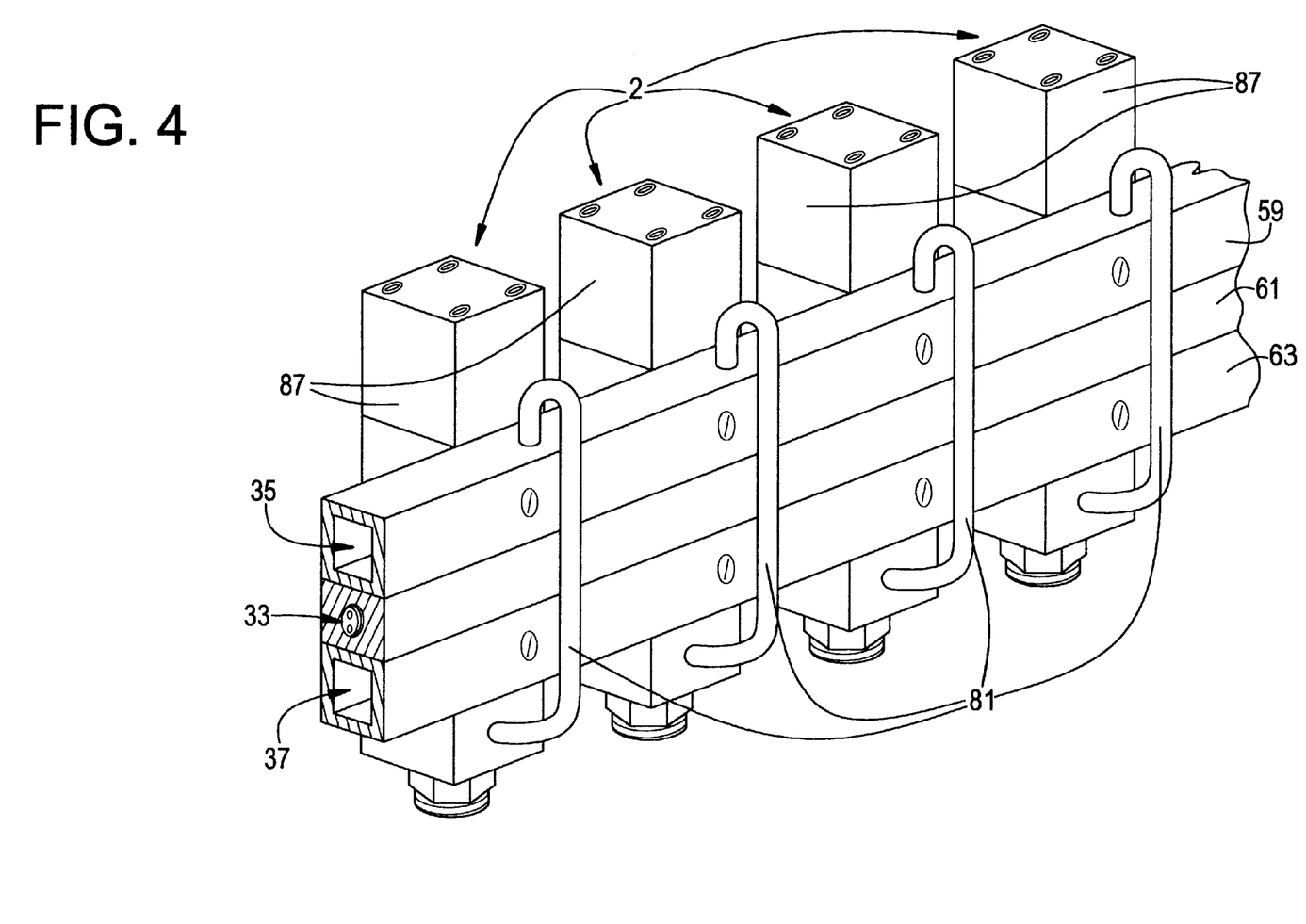
FIG. 4 is a perspective view illustrating a plurality of the FIGS. 1–2 extrusion heads which are placed in a row adjacent the top and/or bottom major surface(s) of the batt(s).

Referring to FIGS. 2 and 4, the extrusion head 2 of FIG. 2 is especially adapted for use as one of the heads provided in row 7 which extends over and above the top of the moving batts. Elongated members 59, 61, and 63 are provided along one side of the row 7 of heads 2 in a manner such that selectively pressurized air conduit 35 within member 59 is in fluid communication with the air chamber 43 of each extrusion head 2 in row 7 so that when a predetermined amount of pressure is provided by a pressurized air source to air conduit 35 of member 59, the result is that the needle valve 41 of each extrusion head in row 7 is opened (i.e. the valve biased upward so as to allow material to be extruded from aperture 51) as the pressure increases in chamber 43 and becomes greater than the biasing forced spring 45. Likewise, elongated member 61 is provided with an elongated heating element 33 therein such that heating element 33 functions to maintain the heightened temperature of the molten material flowing within conduit 37 and the air within conduit 35. Elongated conduit 37 provided in member 63 is also in communication with the extrusion feed chamber 39 of each extrusion head 2 in row 7 such that when the needle valves 41 in row 7 are forced upward due to pressurized air in 43, this molten material in chambers 37 and 39, which is pressurized, is forced outward through extrusion aperture 51 resulting in an extruded synthetic fiber 17 being output from the head.

It is to be pointed out that different types of extrusion heads may be utilized in different embodiments of this invention, as the FIG. 2 illustration is not limiting.

Figure 5:
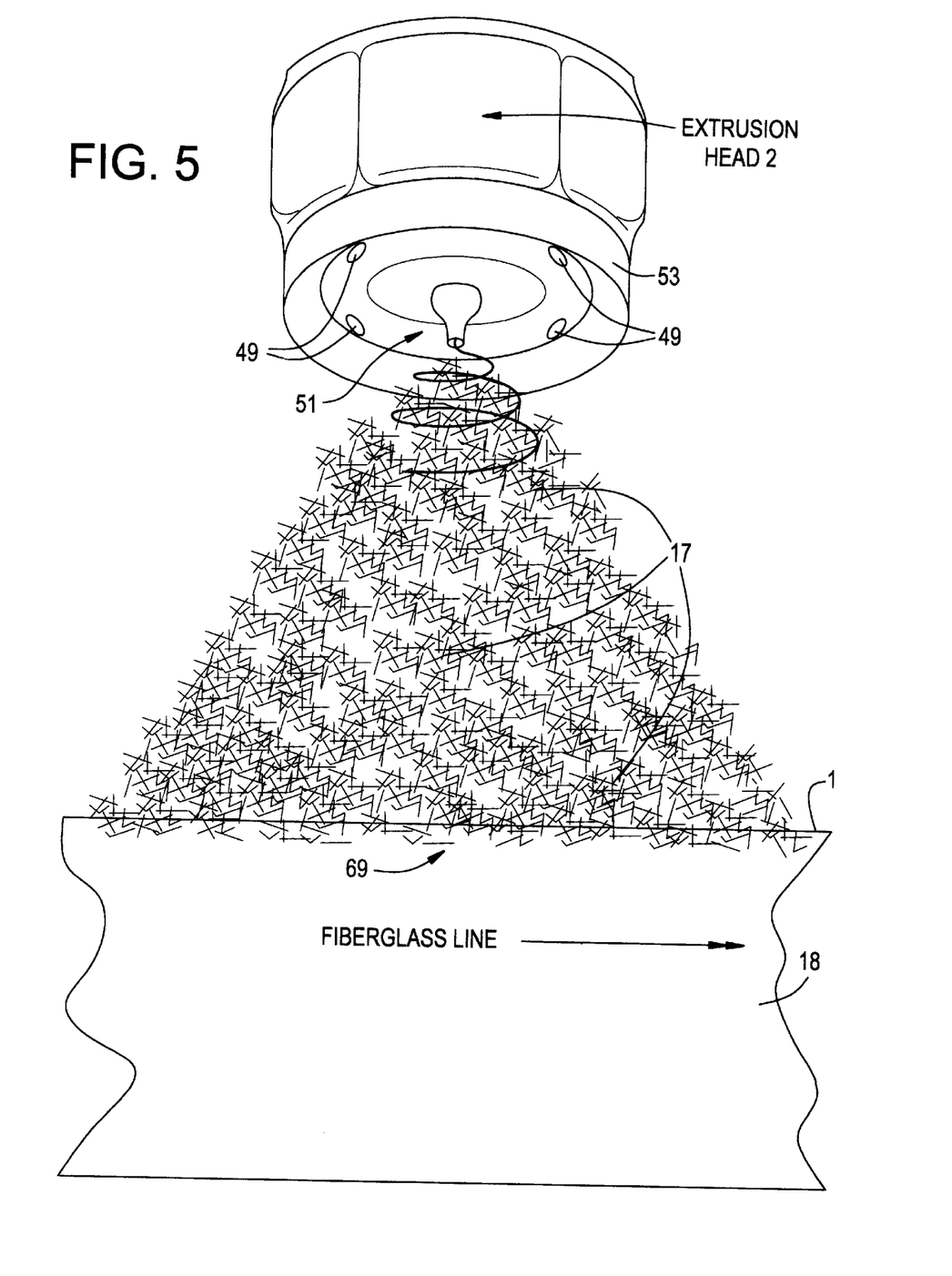
FIG. 5 is a perspective view illustrating how the air jets located proximate the extrusion outlet of an extrusion head according to the FIG. 1–4 embodiment break up the fibers and cause same to fall into an insipid spin as they are directed toward the moving batts.
Figure 6:
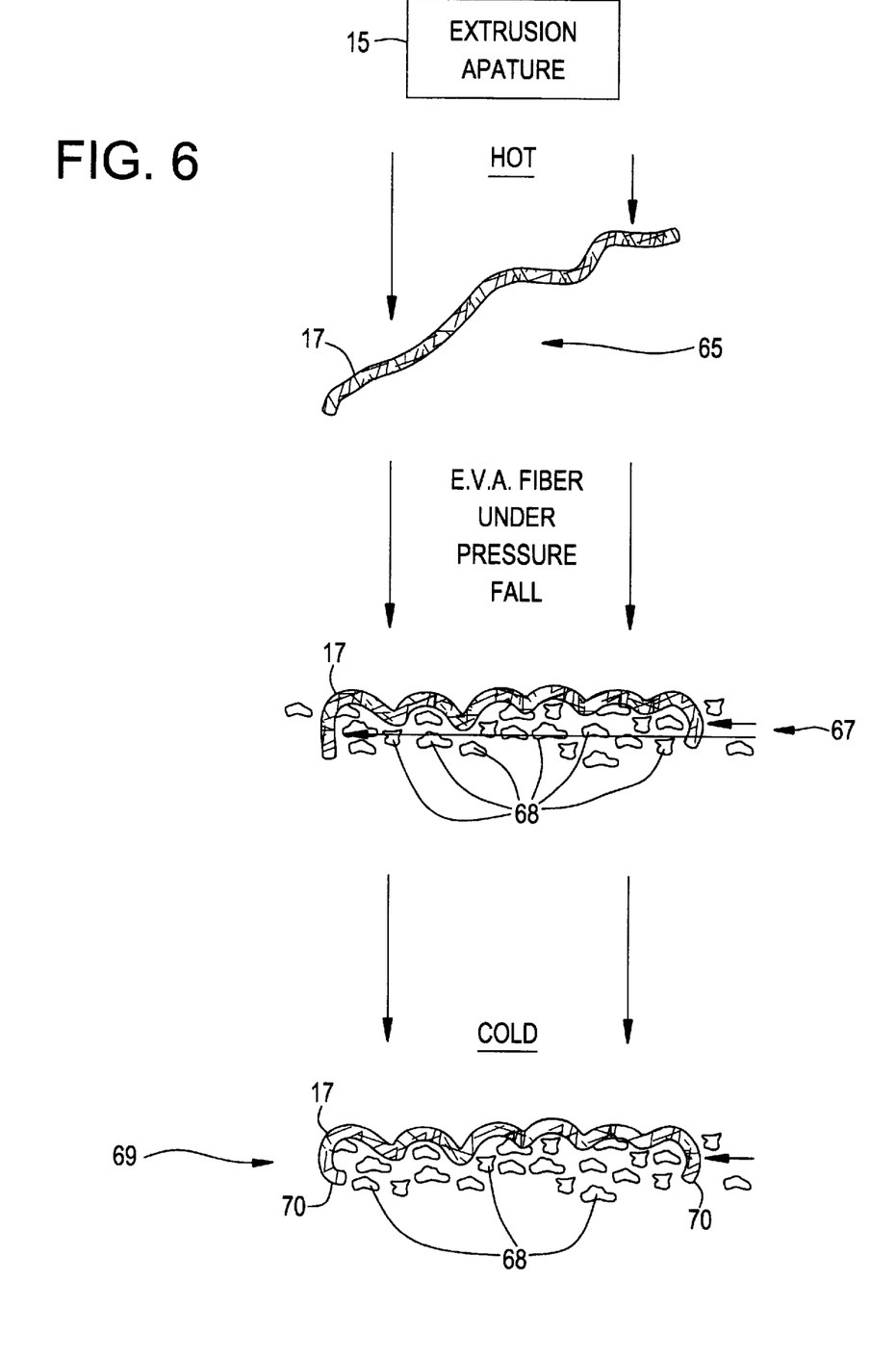
FIG. 6 is a perspective view illustrating how a fiber from one of the extrusion heads of FIGS. 1–5 is directed toward and impregnates the surface of a mineral fiber batt, as the extruded fiber locks onto mineral fibers adjacent the batt's surface during curing or cooling of the extruded fiber.
Figure 7:
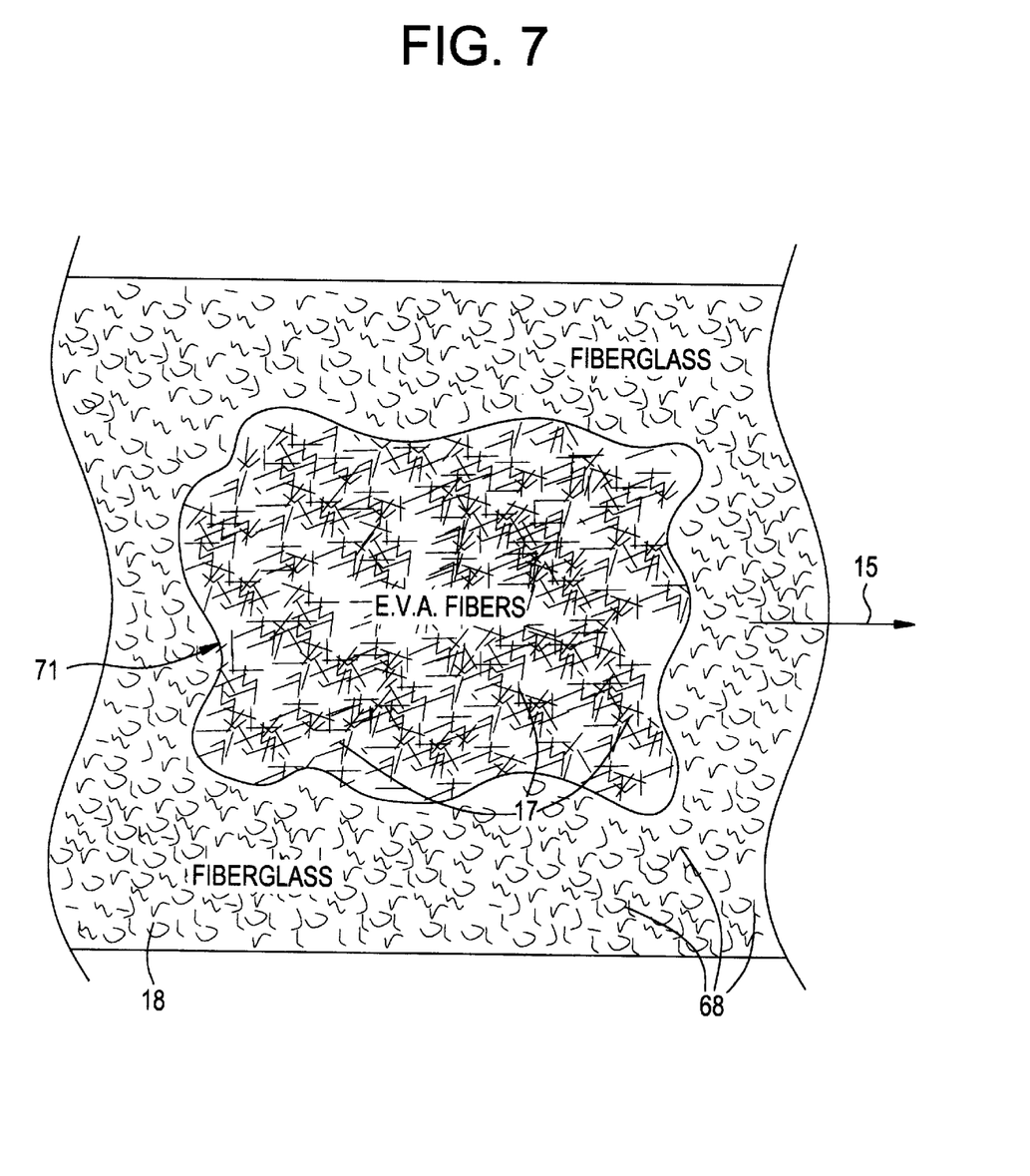
FIG. 7 is a partial top elevational view illustrating extruded ethyl vinyl acetate (EVA) extruded fibers impregnating a major surface of a fiberglass mineral batt.

FIGS. 5–7 further illustrate extruded fibers 17 following their discharge from extrusion aperture 51 as they are blown and/or fall toward the surface (1, 3, 5) of a batt 18. As shown in FIGS. 2 and 5, as the fiber 17 is extruded from outlet aperture 51 formed in extrusion head 2, it is hit with pressurized air directed from angularly oriented orifices 49. The pressurized air streams directed at the fiber 17 forced out of aperture 51 segment or break up the fiber or string of synthetic material as it comes out of aperture 51, and cause the resulting segments or fibers to be directed toward the surface (1, 3, 5) of batt 18 to be impregnated in an insipid spin. An insipid spin is created when the air cuts the fiber starting the fiber to spin, wherein the spin is maintained in the orbit created by the air circulation (see FIG. 5). In this type of spin, the spin axis is not at the center lengthwise of the fiber, and one end of the fiber has a greater spin radius than the opposite end of the elongated fiber.

As a result of this insipid spin, the fibers 17 upon reaching the surface of batt 18 are all oriented in different directions so as to create a crisscross or web of fibers 17 proximate the surface of the batt, thereby creating a cross-locking impregnating effect and resulting in the impregnated batt surface having substantially equal tensile strength in each of the width and machine (length) directions. Thus, when the proper amount of extruded fiber is applied to the batt surface, it is surprisingly tough to delaminate or dislodge.

FIG. 6 illustrates in detail how a single fiber or segment 17 directed from an extruded aperture 51 toward the surface (1, 3, 5) of the batt 18 impregnates the batt surface (i.e. interlocks upon mineral fibers 68 of the batt). From extrusion aperture 51, individual fibers 17 are directed toward the batt surface as shown in FIG. 5 and at 65, the extruded fibers 17 still being very hot and quasi-molten at this point in time. Upon reaching the surface of the batt at 67, each fiber, still in a quasi-molten or flexible state due to its temperature, falls on and across a plurality of different mineral fibers of the batt (e.g. glass fibers 68) and sags over same. As the synthetic extruded fiber 17 cools (i.e. cures), it shrinks as shown at 69 in a manner such that the ends 70 of fiber 17 lock onto adjacent batt fibers 68 thereby providing the interlocking attachment and impregnation of the batt surface.

FIG. 7 illustrates the surface of a fiberglass batt 18 following impregnation of a part of the surface with extruded fibers including EVA. As illustrated, prior to the deposition and impregnation of fibers 17 on the surface of the batt, a majority of the glass fibers 68 of the batt 18 are oriented in the machine or length direction. As a result of the insipid spin created by orifices 49, fibers 17 when reaching the surface of batt 18 are all oriented in different directions as shown in area 71 such that each fiber 17 locks onto glass fiber(s) 68, with the interlocking being provided in a plurality of different directions so as to, in certain embodiments, result in improved tensile strength in the width or cross-machine direction of the batt proximate the surface thereof.

FIG. 4 is a close-up perspective view illustrating a plurality of extrusion heads 2 that are provided in row 7 (i.e. FIG. 2 embodiment). As illustrated, elongated members 59, 61, and 63 are provided along the side of each extrusion head 2 facing batt conveying direction 15. A separate air supply conduit 81 is provided for each extrusion head 2 in order to allow pressurized heated air from chamber 35 to communicate with annular air chamber 55 which supplies pressurized air to orifices 49. Accordingly, whenever pressurized air is provided through air supply chamber 35 of member 59, this simultaneously results in: (i) pressurized air being directed through each of conduits 81 so as to direct pressurized air streams out of orifices 49 defined in each extrusion head 2 in row 7; and (ii) pressurized air being directed via passageway 83 into the needle valve opening air chamber 43 of each extrusion head 2 so that pressurized air in 43 forces surface 85 of the needle valve upward against the biasing force of spring 45 thereby raising and opening needle valve 41 and allowing the molten material in chamber 39 to be forced through and out of extrusion aperture 51. When air is no longer supplied through conduit or air chamber 35 (i.e. when the selectively actuated air source is shut off), spring 45 biases needle valve 41 into its closed position (illustrated in FIG. 2) thereby preventing material from being extruded out of aperture 51. The absence of pressurized air in conduit 35 also stops significant airflow through orifices 49. As shown in FIG. 4, each extrusion head 2 is also provided with a spring retaining head 87 which functions to house and support biasing spring 45.

Optionally, spring 45 may be adjustable by adding, for example, pressure set screw(s) at the top of the head so as to insure that the spring has a fast enough return, especially when high pressures are involved.

Figure 3:
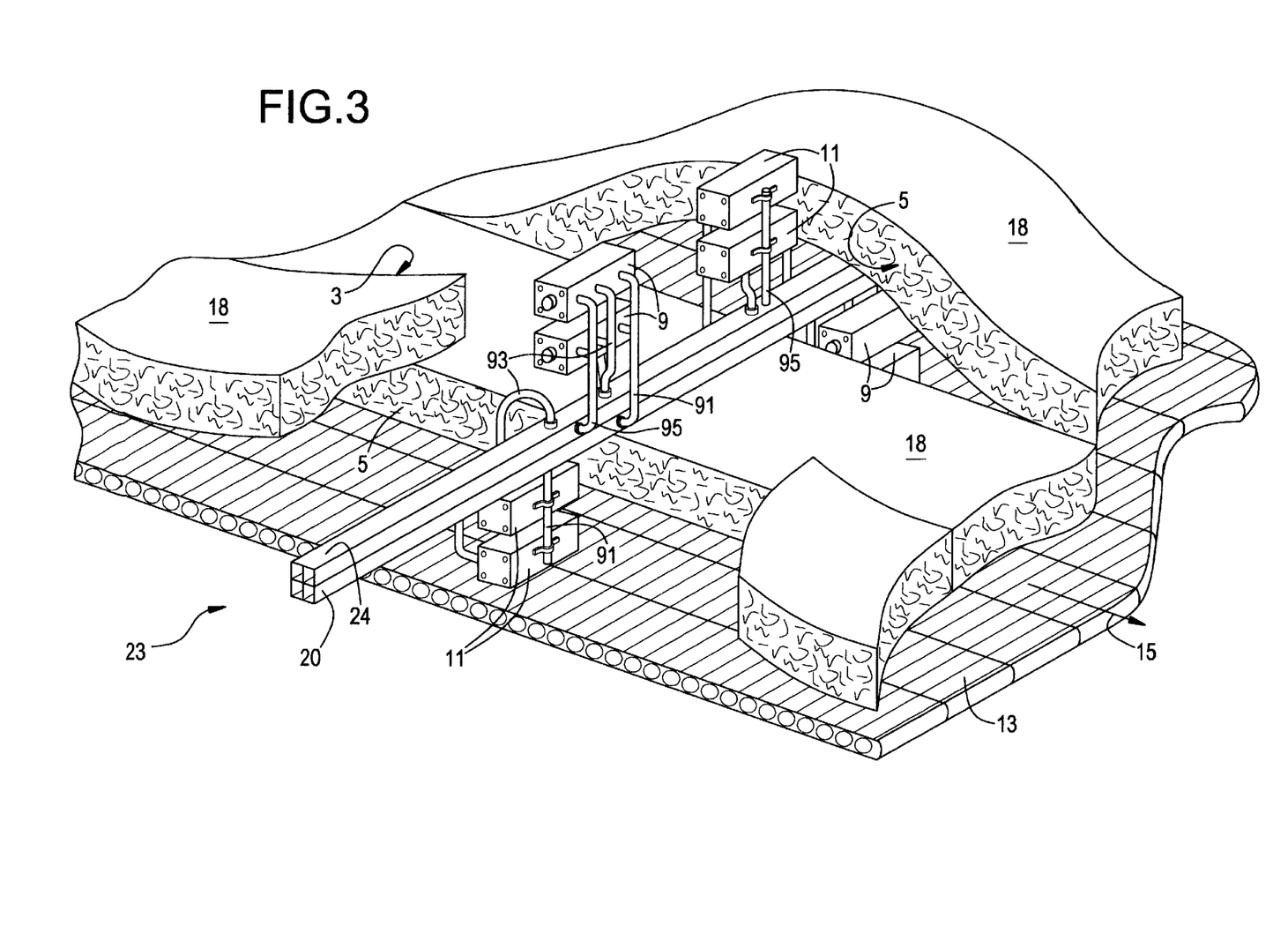
FIG. 3 is a partial perspective view illustrating certain extrusion heads of FIGS. 1–2 applying extruded polymer based fibers to different edge surfaces of the batts in the FIG. 1–2 embodiment of this invention.

FIG. 3 is a partial perspective view illustrating how extrusion heads 9 and 11 direct extruded fibers 17 onto the side edge surfaces 3 and 5, respectively, of batts 18, as alternate batts 18 arc over and are conveyed beneath member 23 which extends over and above conveyor belt 13. As illustrated, elongated member 23 includes air supply conduit 20, and conduit 24 which supplies pressurized molten material to the extrusion heads 9 and 11. Member 23 and/or conduits 20, 24 are oriented or aligned substantially parallel to the surface of conveyor 13 (i.e. ±20° from parallel relative to the conveyor surface). Extrusion heads 9 and 11 are the same as extrusion head 2 illustrated in FIG. 2, except that members 59, 61, and 63 are provided as part of elongated member 23 which is disposed in a spaced relation relative to the extrusion heads. Heads 9 and 11 direct fibers 17 in opposite directions to batt edge surfaces, and are oriented such that they direct/blow fibers 17 horizontally toward the edge surfaces, as opposed to vertically.

Still referring to FIG. 3, conduits 91 attached to air supply member 20 function to supply pressurized air from member 20 to each of the extrusion heads 9 and 11 so as to selectively open their needle valves 41 and cause air to be output from orifices 49. Meanwhile, conduits 93 supply heated molten material such as EVA to each extrusion head from member 24. As illustrated, for each batt 18 being conveyed along belt 13, first and second extrusion heads 9 are positioned on one side of the batt so as to direct extruded fibers 17 onto one edge surface thereof, while another two extrusion heads 11 are provided on the other side of the batt in order to direct extruded fibers 17 onto the opposite edge surface thereof. In such a manner, each edge surface (3, 5) of each batt 18 is impregnated with the extruded fibers directed from the illustrated heads 9, 11.

Still further, in order to carry out this edge impregnation, every other or alternate batt 18 is conveyed over top of member 23, such that, for example, the odd numbered batts 18 are conveyed over member 23 while the even numbered batts 18 are conveyed along belt 13 underneath of member 23 thereby providing sufficient space for extrusion heads 9 and 11 to be mounted to member 23 via mounting members 95 in order to impregnate the edge surfaces. As discussed above, in certain embodiments of this invention, extrusion heads are also provided adjacent the lower major surface of each batt 18 so as to fully encapsulate the batts with each of the two major surfaces and each of the two edge surfaces of each batt with extruded EVA fibers. Also, in certain embodiments, the top major surface of a batt 18 may be impregnated with the extruded fibers 17, and the two opposing edge surfaces may also be impregnated with the extruded fibers, while the bottom major surface is simply coated with a layer of vapor impermeable kraft paper. Kraft paper may in certain embodiments be applied over top of the extruded fibers on some or all batt surfaces.

Certain flow, temperature, and material parameters have been found by the instant inventors to be important in carrying out the different embodiments of this invention discussed above and are described as follows. The preferred synthetic material to be extruded into fibers 17 for impregnation of the batt surfaces is ethyl vinyl acetate (EVA) synthetic resin modified to withstand high heats so as to ensure no blocking during storage and shipping. An exemplar EVA is available from H.B. Fuller Canada, Inc., as material number HM-5782. Other types of EVA may also be used.

The viscosity of the EVA during extrusion may range from about 650 up to about 850 centipoise (cps). Preferably, the viscosity is from about 650–725 cps in order to get a better flow which results in improved penetration of the extruded fibers 17 into and around the fiberglass fibers of the batt 18 prior to curing/cooling.

The lower the viscosity, the higher the heat required to maintain the EVA in this state. As will be appreciated by those of skill in the art, a heating device (not shown) within unit 25 along with heating elements 33 provided adjacent the extrusion heads 2, 9, 11 maintain the EVA in a molten state as it flows toward and through the extrusion heads. It has been found that the best results are obtained when these heating elements output a temperature of from about 170°–270° C., preferably approximately 200° C. [range of from about 180–225° C.] or 360° F., in order to maintain proper EVA flow through conduits 22, 24, and 37, as well as through the various extrusion heads discussed above.

Referring to FIGS. 2 and 5, preferably, from about four (4) to ten (10) jet orifices 49 are provided adjacent the output aperture 51 of each extrusion head. In certain embodiments, six such orifices 49 are provided and oriented in a circular manner around each output orifice 51. When the heated air [at from about 200–225° F.] is initially fed through air conduit 35, in order to open the needle valves and cause extrusion to begin, the air pressure within conduit 35 and thus within chambers 43 and 55 is substantially continuously increased from about 0 psi up to a level of from about 10–75 psi (preferably from about 10–30 psi, and most preferably about 20 psi). As this air pressure increases and the pressurized air flows from orifices 49, the increasing pressure breaks up the fiber being extruded from orifice 51 into a plurality of individual fibers or segments 17 as shown in FIG. 5. The pressure provided in air chamber 35 and thus air chamber 55, dictates the length of fibers 17 which are directed toward the surface of the batt to be impregnated. For example, if 15 psi is provided in chamber 55, the fibers 17 directed toward the batt will be longer than if 30 psi is provided in chamber 55. For example, when 20–30 psi is provided in chamber 55, each fiber 17 directed toward the batt has a length of from about one-quarter to three-quarter inches, with the fiber length averaging approximately one-half inch. When about 10 psi is provided to chamber 55, the individual fibers 17 being directed toward the batt have an average length of from about three-quarters of an inch to one and one-half inches. Accordingly, during extrusion, the pressure of the heated air provided to chambers 35, 43, and 55 may be at a level from about 10–75 psi, preferably from about 10–30 psi, and most preferably about 20 psi.

Also, pump pressure will affect fiber length.

It has been surprisingly found that superior results are achieved when from about 1.20 to 3.50 gms. per ft$^2$ of extruded fibers 17 are provided on the surface(s) of a batt 18 to be impregnated, this amount being most preferably within a range of from about 1.90 to 2.50 gms. per ft$^2$. These amounts have been found by the instant inventors to hold the fibers within the batt and reduce dust, while at the same time being aesthetically pleasing and cost effective. Also, these amounts result in strong adherence of the fibers 17 to the batt [if too much extruded fiber is applied, it becomes easily delaminated and approaches an undesirable vapor barrier].

The air provided to chamber 35 is preheated in certain embodiments of this invention, and may be preheated at a temperature ranging from about 200°–210° F. in order to achieve optimum results herein.

In row 7 of extrusion heads 2, it has been found that superior results are achieved when the outlets 51 of the extrusion heads 2 are spaced from the upper major surface 1 of batts 18 at a distance of from about 2 to 12 inches, preferably from about 4 to 8 inches. On the other hand, the results are best when the extrusion outlets 51 of heads 9 and 11 are positioned from about 2–6 inches from the edge surfaces to be impregnated, while it is believed that positioning outlets 51 located adjacent the bottom major surface of the batts 18 to be impregnated at a distance of from about 1–4 inches will provide the best results.

It has also been found by the instant inventors that the orientation of orifices 49 is important in achieving the desired results disclosed herein. Each orifice 49 is oriented such that its elongated axis which dictates the air flow toward the extruded fibers is oriented at an angle of about 20° relative to a direction which is perpendicular to the axis of needle valve 41. Thus, for extrusion heads 2 in row 7 that are oriented such that outlets 51 are directed downward, orifices 49 are oriented such that their elongated axes which dictate the air flow direction are angled at from about 10°–40°, preferably about 20°, relative to the horizontal.

Each head 2 includes orifice 51 which has a diameter of approximately 0.020 inches through which the fibers 17 are extruded. The fibers thin out immediately after leaving apertures 51. When the fibers reach a distance of approximately 0.070 inches from outlet 51, they have thinned down to a diameter of from about 0.004 to 0.012 (preferably approximately 0.010) inches, and have started to coagulate. At this time, the pressurized air streams directed from orifices 49 toward the fibers causes the fibers to change direction and fall into the insipid spin. The insipid spin diameter is controlled by the air pressure. For example, at 10 psi, the spin diameter would be approximately 0.500 inches, and at 60 psi the diameter would be about 0.750 inches. Once the insipid spin is created during the initial increase in air pressure during extrusion start-up, it is maintained as the air pressure increases through the 10 psi level, and through the 10–20 psi level up to the desired level of approximately 10 to 30 psi.

Still further, the speed of extruding the fiber from the extrusion heads is controlled by the pressure applied to conduit 37 giving the system the capability of maintaining a consistent surface impregnation amount/rate at different line speeds.

When synthetic material including EVA is used to form the fibers, the cure or set time of the fibers to form the impregnation is less than about 5 seconds, and preferably from about 2–4 seconds.

Additional advantages of the system, resulting from the impregnation characteristics described above, include resistance to sagging or packing under vibration which renders the product suitable for use in vehicles, railcars boats, and the like. Because of the interlocking impregnation characteristics, this product may be used in roll-up applications, such as concrete curing blankets and insulated hanging devices, curtains, and the like, as well as in cool rooms, such as meat packaging environments. Still further, after the elongated batts 18 illustrated in FIG. 1 are cut into segments and rolled, they may be forwarded to commercial or residential insulation sites for use in wall cavities, attics, and the like. Other applications include sound insulation inside of duct applications, and the like.

Still another advantage of this invention is that the synthetic material impregnation represents a satisfactory vapor permeable layer in the amounts applied that are disclosed herein. These amounts of EVA, for example, result in sufficient vapor permeability so that the compression ratio of the resulting batts 18 is from about 4 to 10:1, preferably from about 6 to 7:1. For example, a fiberglass batt roll originally having a seven (7.0) foot diameter may be compressed down to about a 1.2 foot diameter.

Instead of EVA, other synthetic materials can be used as the molten material that is extruded via heads 2, 9, and 11 onto batt surfaces in all embodiments herein, there materials including, for example, hot-melt polyamides, attactic polyolefines, polyesters, polyethylenes, pressure sensitive hot-melts, rubber-based hot-melts, and moisture cure hot-melts. However, it has been found by the instant inventors that none of these materials are as preferable as EVA types due at least in part to the short cure times of EVAs. In certain embodiments, the synthetic may include a combination of certain of the materials discussed above, or alternatively be made up of only one or two of these materials.

It is noted that the EVA inclusive materials are preferred due to their more rapid cure or set times.

According to alternative embodiments of this invention, the synthetic material (e.g. EVA) may be extruded onto at least one surface of a plastic or polymer (e.g. polyethylene or polypropylene) fiber batt, instead of mineral fiber batts.

Once given the above disclosure, various other modifications, features, and improvements will become apparent to the skilled artisan, such other features, modifications, and improvements are thus considered a part of this invention. The scope of which is to be determined by the following claims.

We claim:

1. A mineral fiber insulation batt comprising:

a mineral fiber insulation substrate including a top major surface, a bottom major surface, a first edge surface, and a second edge surface opposing said first edge surface; and wherein said first and second edge surfaces are impregnated with extruded fibers including ethyl vinyl acetate which are interlocked with mineral fibers of the batt proximate the first and second edge surfaces, said extruded fibers applied to said first and second edge surfaces of the batt in an amount of from about 1.2 to 3.5 gms/ft$^2$.

2. The mineral fiber insulation batt of claim 1, wherein said batt has a density of from about 0.5 to 2.5 lbs/ft$^3$, and an R-value of from about 2.5 to 4.0 per inch of batt thickness.

3. The mineral fiber insulation batt of claim 2, wherein the extruded fibers are applied to said first and second edge surfaces in an amount of from about 1.90 to 2.50 gms/ft$^2$.

4. The mineral fiber insulation batt of claim 3, wherein said extruded ethyl vinyl acetate inclusive fibers on said first and second edge surfaces of said batt form a vapor permeable coating on said edge surfaces so that said batt has a compression ratio of from about 4:1 to 10:1.

5. A mineral fiber insulation batt comprising:

a mineral fiber insulation substrate including a top major surface, a bottom major surface, a first edge surface, and a second edge surface opposing said first edge surface;

synthetic extruded fibers impregnating said first and second edge surfaces of said mineral fiber insulation substrate, so that the extruded fibers are interlocked with mineral fibers of the substrate proximate the first and second edge surfaces; and wherein said extruded fibers form a vapor permeable layer on said first and second edge surfaces so that said batt has a compression ratio of from about 4:1 to 10:1.

6. The mineral fiber insulation batt of claim 5, wherein said extruded fibers applied to said first and second edge surfaces of the batt are applied in an amount of from about 1.2 to 3.5 gms/ft$^2$.

7. The mineral fiber batt of claim 6, wherein the extruded fibers are applied to said first and second edge surfaces in an amount of from about 1.90 to 2.50 gms/ft$^2$.

8. The mineral fiber insulation batt of claim 5, wherein said extruded fibers are extruded from a material and applied to said substrate so that the cure time of the extruded fibers required for the first and second edge surfaces to be impregnated with the extruded fibers is less than about 5 seconds.

9. The mineral fiber insulation batt of claim 8, wherein the extruded fibers include ethyl vinyl acetate (EVA).

* * * * *